United States Patent [19]

Wear et al.

[11] Patent Number: 5,606,661
[45] Date of Patent: Feb. 25, 1997

[54] APPARATUS AND METHOD FOR SCAN-BASED TESTING IN AN OBJECT-ORIENTED PROGRAMMING ENVIRONMENT

[75] Inventors: Larry L. Wear, Sacramento; Diana L. Magrey, San Jose, both of Calif.

[73] Assignee: Tandem Computers Incorporated, Cupertino, Calif.

[21] Appl. No.: 472,306

[22] Filed: Jun. 7, 1995

[51] Int. Cl.⁶ .................................................. G06F 11/00
[52] U.S. Cl. ...................... 395/183.14; 395/614; 395/704
[58] Field of Search .................. 395/183.13, 183.14, 395/500, 700, 600

[56] References Cited

U.S. PATENT DOCUMENTS

| | | | |
|---|---|---|---|
| 5,129,083 | 7/1992 | Cutler et al. | 395/600 |
| 5,255,385 | 10/1993 | Kikuchi | 395/700 |
| 5,357,452 | 10/1994 | Pio-di-Savoia et al. | 364/579 |
| 5,416,900 | 5/1995 | Blanchad et al. | 395/155 |
| 5,485,617 | 1/1996 | Stutz et al. | 395/700 |

OTHER PUBLICATIONS

Article by James Rumbaugh, entitled "Going With the Flow," published in the Journal of Object–Oriented Programming (JOOP), by SIGS Publications, Inc., Jun. 1994.

*Primary Examiner*—Robert W. Beausoliel, Jr.
*Assistant Examiner*—Ly V. Hua
*Attorney, Agent, or Firm*—Graham & James LLP

[57] ABSTRACT

An apparatus and method for testing objects in an object-oriented programming environment. The object class hierarchy is defined so that a TopObject has a constructor function that initializes a linked list when the first class in the hierarchy is instantiated to create the first object. Each time an object of a class in the TopObject class hierarchy is instantiated, the TopObject constructor adds an entry for the new object to the linked list. A TestObject accesses the list to perform a predetermined testing function on one or more of the objects in the system. The object hierarchy class can also be defined as having multiple inheritance such that a class in the program inherits program functionality from one class and inherits testing functionality from the test class.

18 Claims, 8 Drawing Sheets

EXAMPLE OF TESTING FUNCTION

APPARATUS AND METHOD FOR SCAN-BASED TESTING IN AN OBJECT-ORIENTED PROGRAMMING ENVIRONMENT

BACKGROUND OF THE INVENTION

This invention relates to an apparatus and method for testing software and, more particularly, to an apparatus and method for testing one or more objects in an object-oriented software environment.

Software development is a complicated activity. In recent years, software programs have been getting larger and the relationships between sub-parts in a software program have been getting more complex. In addition, the advent of object-oriented programming has brought new opportunities and difficulties to the software development process.

Object-oriented software is comprised of a set of "objects" that are, as much as possible, complete entities, passing messages back and forth between themselves. There is no predetermined path that determines the flow of control through the program. There are only possible paths, depending on the sequence of message passing.

The nature of object-oriented programming leads to a number of unusual testing problems. For example, it is important to verify that the data structures in each object are correct and that the data in the data structures is valid. Often, however, data structures are accessible only to the objects that contain them and are not accessible to other objects. Additionally, it is important to be able to identify the point in the program at which an error occurred. Again, the nature of object-oriented programming makes this more difficult.

What is needed is a simple way of checking both the structure and contents of data structures in an object and a way of communicating where in a plurality of objects an error has occurred.

SUMMARY OF THE INVENTION

The present invention implements scan-based testing in an object-oriented environment. The term "scan-based testing" is used because the invention is analogous to scan-based testing in hardware. The invention keeps track of all objects currently instantiated in the system and, with a single message or function call initiates a plurality of testing functions in respective ones of the instantiated objects. All objects of the same class contain the same testing function.

The invention can also be used to initiate testing functions in some subset of the total instantiated objects. Moreover, some or all of the testing functions may attempt to correct errors discovered in their respective objects.

The fact that testing functionality is built into each object allows for online testing, program maintenance, and object reusability. The data and data structures can be tested at any time. New objects can be added and removed at any time because each object contains its own testing functionality. The testing function in one class can be modified or enhanced without affecting any of the other classes in the system. Moreover, the testing functionality in the objects instantiated from these classes makes each object a more reliable unit. The testing functions in the respective instantiated objects are executed by a test stimulus that is external to the normal program control flow. This external test stimulus allows the integrity of the data and data structure to be tested regardless of whether normal program execution has been able to reach a certain point in the program.

In accordance with the purpose of the invention, is embodied and broadly described herein, the invention is a method of testing individual objects in an object-oriented programming environment, comprising the steps, performed by a data processing system, of: establishing a container object that will be updated to contain a pointer to each newly instantiated object; establishing a function for the TopObject class that places in the container object a pointer to each newly created object when each new object is created; creating a new object that belongs to the TopObject class, thereby causing the function to add a pointer in the container object for the new object; and performing a testing function that will traverse the object pointers in the container object and will invoke a testing function in each object pointed to.

In accordance with the purpose of the invention, as embodied and broadly described herein, the invention is an apparatus, comprising: a plurality of objects in an object class, each of the plurality of objects having an associated testing function; a container object that contains a plurality of pointers the respective ones of the plurality of objects; and a tester that performs the testing functions in the plurality of objects in accordance with the pointers of the container object.

Various advantages of the present invention will become more fully apparent when the following detailed descriptions of the invention are read in conjunction with the accompanying drawings.

BRIEF DESCRIPTION OF THE DRAWINGS

The invention will now be described with reference to the accompanying drawings, wherein.

DETAILED DESCRIPTION OF THE PREFERRED EMBODIMENTS

The following description is of the best presently contemplated modes of carrying out the invention. This description is made for the purpose of illustrating the general principles of the invention and is not to be taken in a limiting sense.

Figure 1:
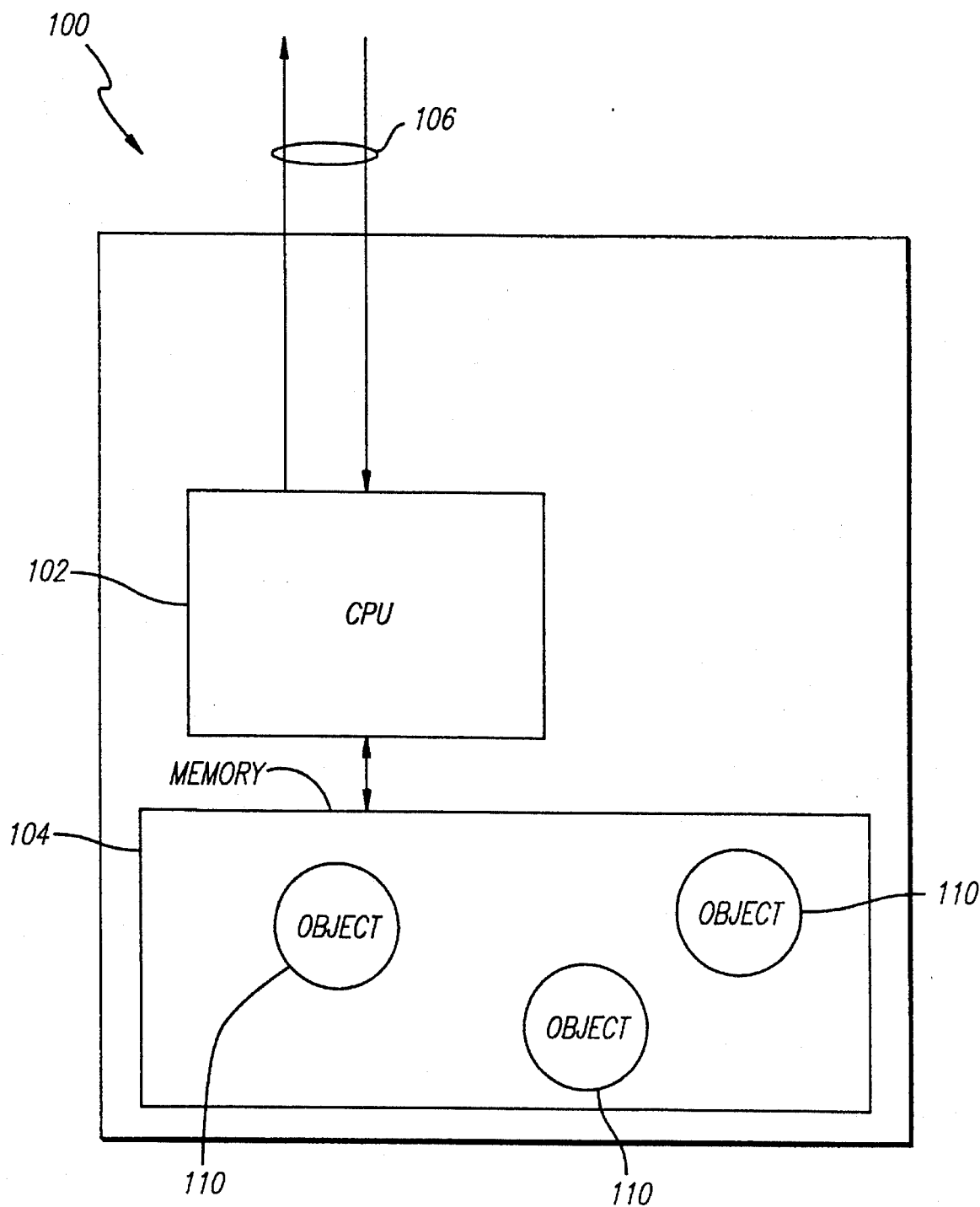
FIG. 1 is a block diagram of a computer system.

FIG. 1 is a block diagram of a computer system 100 in accordance with the present invention. Computer system 100 includes a CPU 102, a memory 104, and input/output lines 106. It will be understood by a person of ordinary skill in the art that computer system 100 can also include numerous elements not shown in the Figure for the sake of clarity, such as disk drives, keyboards, display devices, network connections, additional memory, additional CPUs, etc.

Memory 104 includes a plurality of objects 110 that reside in an object-oriented programming environment. These objects may be objects in a C++ programming environment, objects in a Smalltalk programming environment, etc. A person of ordinary skill in the art will understand that memory 104 also contains additional information, such as application programs, operating systems, data, etc., which are not shown in the figure for the sake of clarity.

Figure 2:
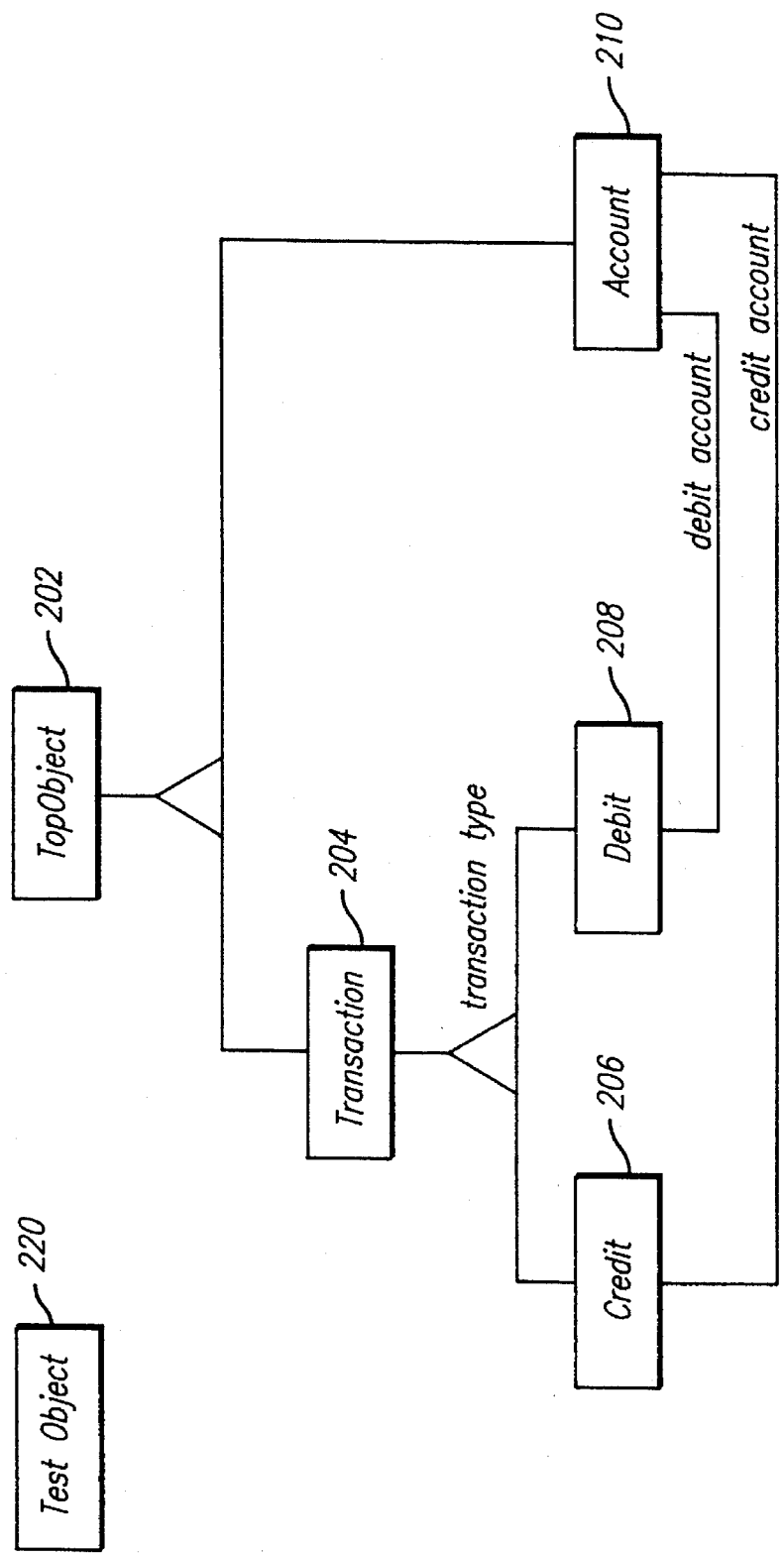
FIG. 2 is a diagram of the classes in an object-oriented system, where the classes include a TopObject class hierarchy and a global TestObject class.

A preferred embodiment of the invention will now be described in connection with a simple example of an object-oriented program for checkbook maintenance. FIG. 2 is a diagram showing the class hierarchy in the example object-oriented system. The base class is the TopObject class 202. The classes that are derived from the TopObject class include a Transaction class 204 and an Account class 210. Transaction class 204 further includes a Credit class 206 and a Debit class 208. A separate class TestObject 220 is not a part of the TopObject class hierarchy. Appendix A shows source code written in the C++ programming language that implements the example given in this document.

Figure 3:
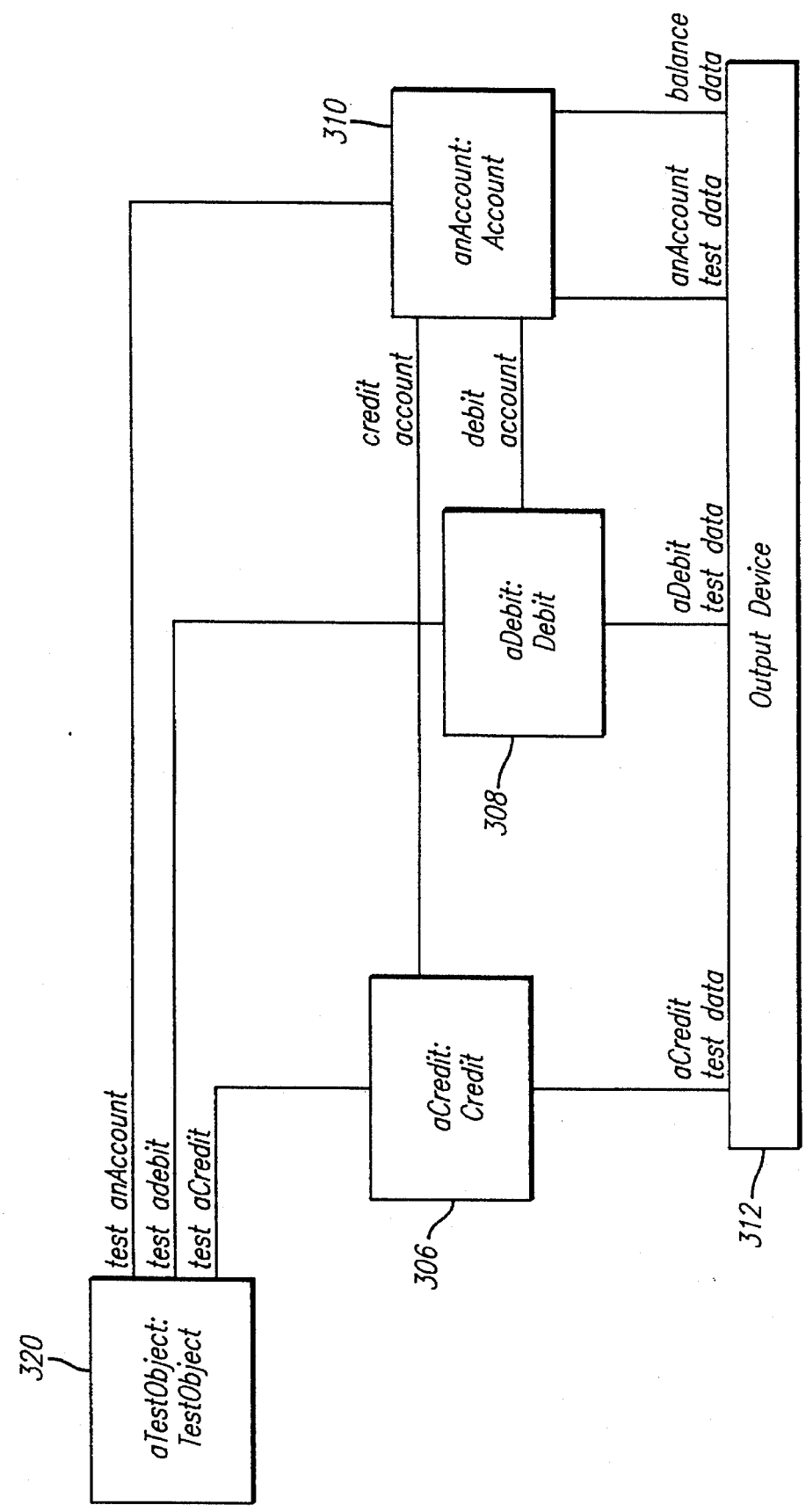
FIG. 3 is a diagram of a sample set of objects that can be instantiated from the classes of FIG. 2.

FIG. 3 is a diagram of a set of objects that can be instantiated from the classes in FIG. 2. During execution, the object-oriented program causes objects of the various classes to be created (i.e., "instantiated"). In FIG. 3, for example, the object "aCredit" 306 is instantiated from the Credit class. The object "aDebit" 308 is instantiated from the Debit class. The object "anAccount" 310 is instantiated from the Account class. The object "aTestObject" is instantiated from the TestObject class. It will be understood that more than one object of each class could be instantiated in other systems.

Figure 4:
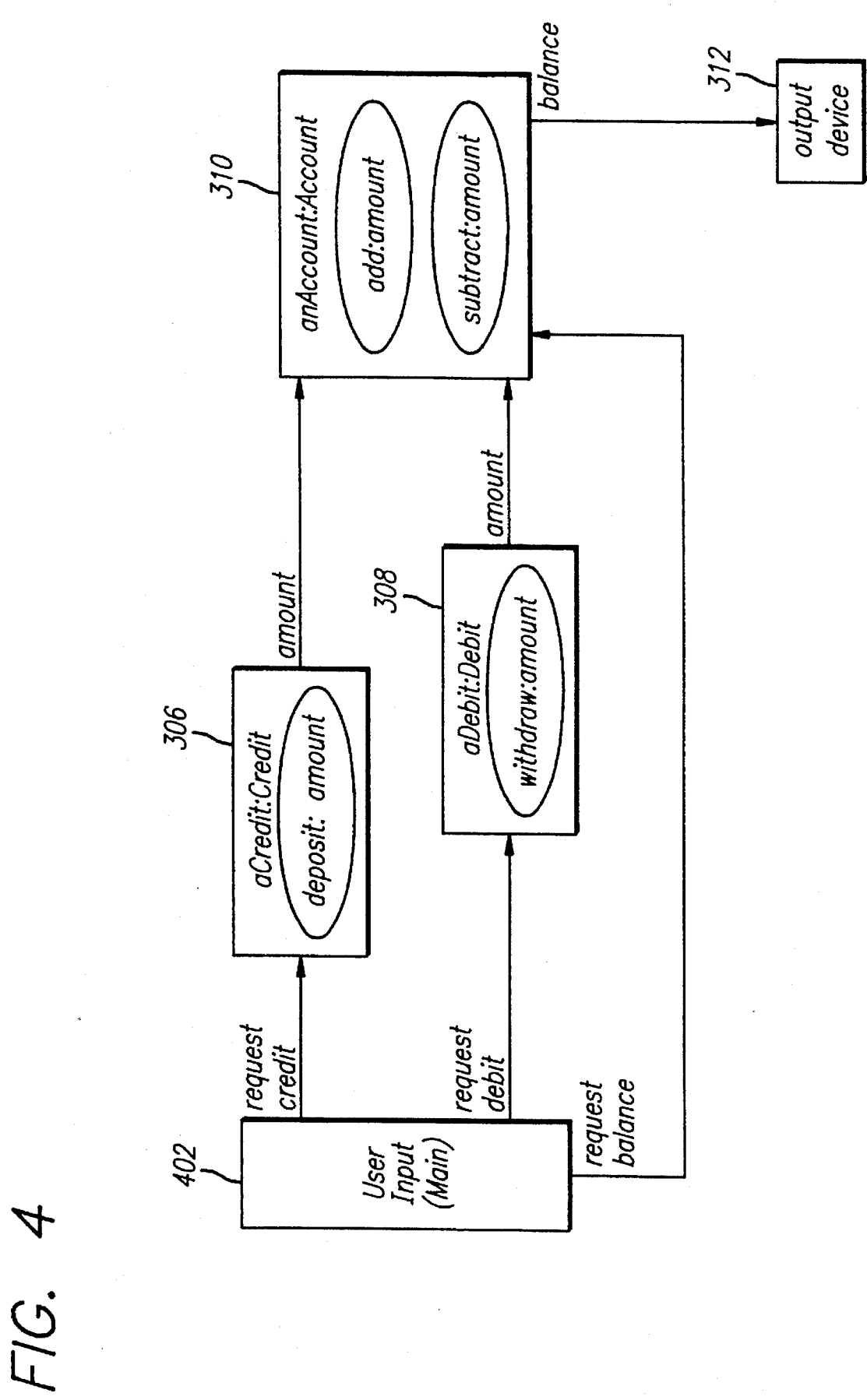
FIG. 4 is a diagram of a data flow in the system of FIGS. 2 and 3 during an operation mode.

FIG. 4 is a diagram of a data flow in the system of FIGS. 2 and 3 during a normal operation mode. A main C++ program 402 requests credits from aCredit object 306, requests debits from aDebit object 308, and requests that an account balance be printed on output device 312 from anAccount object 310 in response to input from a human being.

Figure 5:
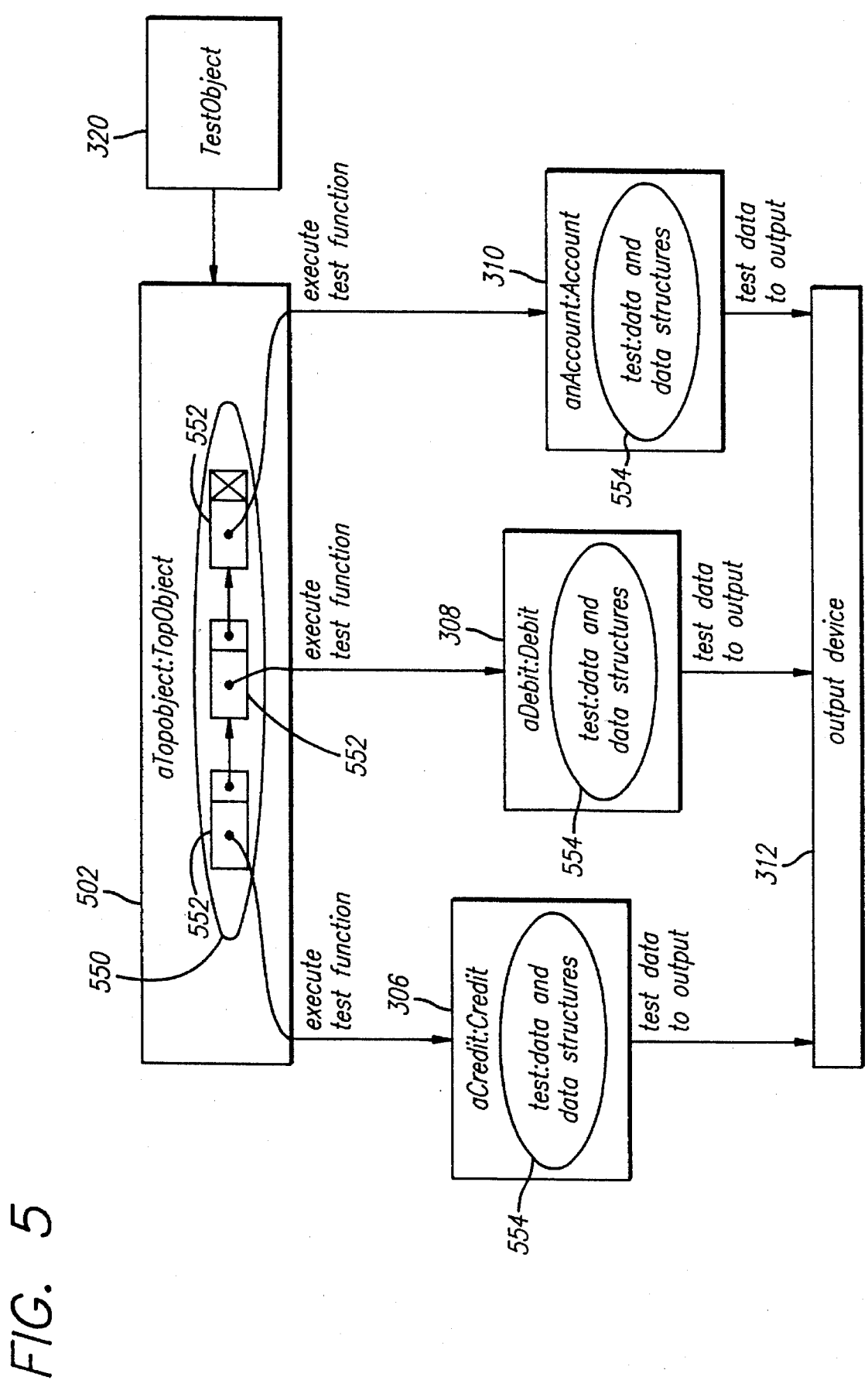
FIG. 5 is a diagram of a data flow in the system of FIGS. 2 and 3 during a test mode.

FIG. 5 is a diagram of a data flow in the system of FIGS. 2 and 3 during a test mode. FIG. 5 is discussed below in connection with the flow charts of FIGS. 6–9. Although the following discussion speaks in terms of constructors and objects performing actions, it will be understood that the steps of FIGS. 6–9 are performed by CPU 102 performing instructions stored in memory 104

Figures 6, 7, 8:
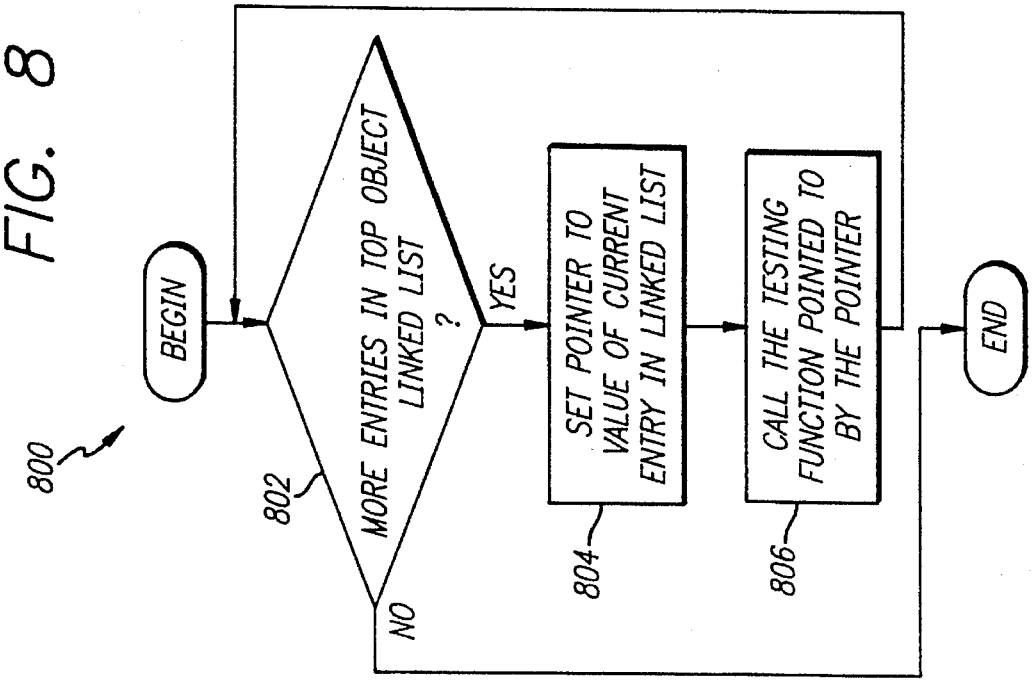
FIG. 6 is a flow chart of steps performed before any class in the TopObject class hierarchy is instantiated.
FIG. 7 is a flow chart of steps performed when an object belonging to the TopObject class hierarchy is instantiated.
FIG. 8 is a flow chart of steps performed by an object of class TestObject.

As will be understood by persons of ordinary skill in the art, the TopObject class 202 is defined to have associated "constructor" software. This constructor is executed each time a class in the TopObject class hierarchy is instantiated. FIG. 6 is a flow chart 600 of steps performed before any class in the class Topobject 202 is instantiated. For example, the steps of FIG. 6 can be performed before the main program 402. Step 602 of FIG. 6 creates a linked list 550 in TopObject 502 (FIG. 5 shows linked list 550 containing three entries). Linked list 550 is an example of a "container object". Linked list 550 preferably is a "static" data structure, which means that it is in existence for the duration of execution and that it is accessible to all objects in the object-oriented environment. It will be understood that implementations of the invention using other programming languages, such as Smalltalk, will use slightly different mechanisms to ensure that each object's testing function is accessible to the TopObject.

FIG. 7 is a flow chart 700 of steps performed when an object belonging to the TopObject class hierarchy is instantiated. For example, the steps of FIG. 7 are performed when anAccount object 310 is instantiated. The steps of FIG. 7 are also performed when objects of classes Credit and Debit are instantiated. In step 702, a new entry for the newly instantiated object is added to linked list 550. Thus, for the example of FIG. 5, objects 306, 308, and 310 have been instantiated and the Topobject constructor has added an entry to linked list 550 for each newly instantiated object. The value 552 in each linked list entry points to an instantiated object. Once there is a pointer to an object, this pointer can be used to execute any function in the object. Here the pointer is used to execute testing function 554.

FIG. 8 is a flow chart of steps performed by an object 320 of class TestObject. The steps of FIG. 8 perform respective testing functions 554 (using linked list 550) that are particular to each object in the system. If, in step 802, there are additional entries in linked list 550 (i.e., if the entire list has not been processed yet), then control passes to step 804. Otherwise control passes to the end. Step 804 sets a pointer to the value of the current entry in linked list 550. Step 806 calls the test function in the object pointed to by the pointer. Thus, the steps of FIG. 8 step through linked list 550 and call a testing function 554 for each object that has been instantiated. The object-oriented system works either in normal operation mode or in test mode. When the testing functions 554 are being executed, the system is in test mode and normal program processing is suspended. Thus, every object in the programming environment is tested.

In another embodiment of the invention, the system includes an "iterator" object that also has access to linked list 550. The iterator is provided with a value "n" and steps through the entries of linked list 550 until it reaches an entry number "n". TestObject 320 then accesses entry number n to invoke the testing function only for the object corresponding to that entry.

In the present invention, the testing function 554 in objects of each class may differ from the testing function 554 for objects of other classes. The testing functions 554 themselves may be any test or process deemed useful to program development. In the example of Appendix A, each testing function merely prints out an identifying code for its object and the values of data local to its object. In the example of Appendix A, the identifying code for the object is entered by the user when the object is instantiated. Other implementations could use, e.g., a random number generator to generate an identifying code for each object or each testing function.

Figure 9:
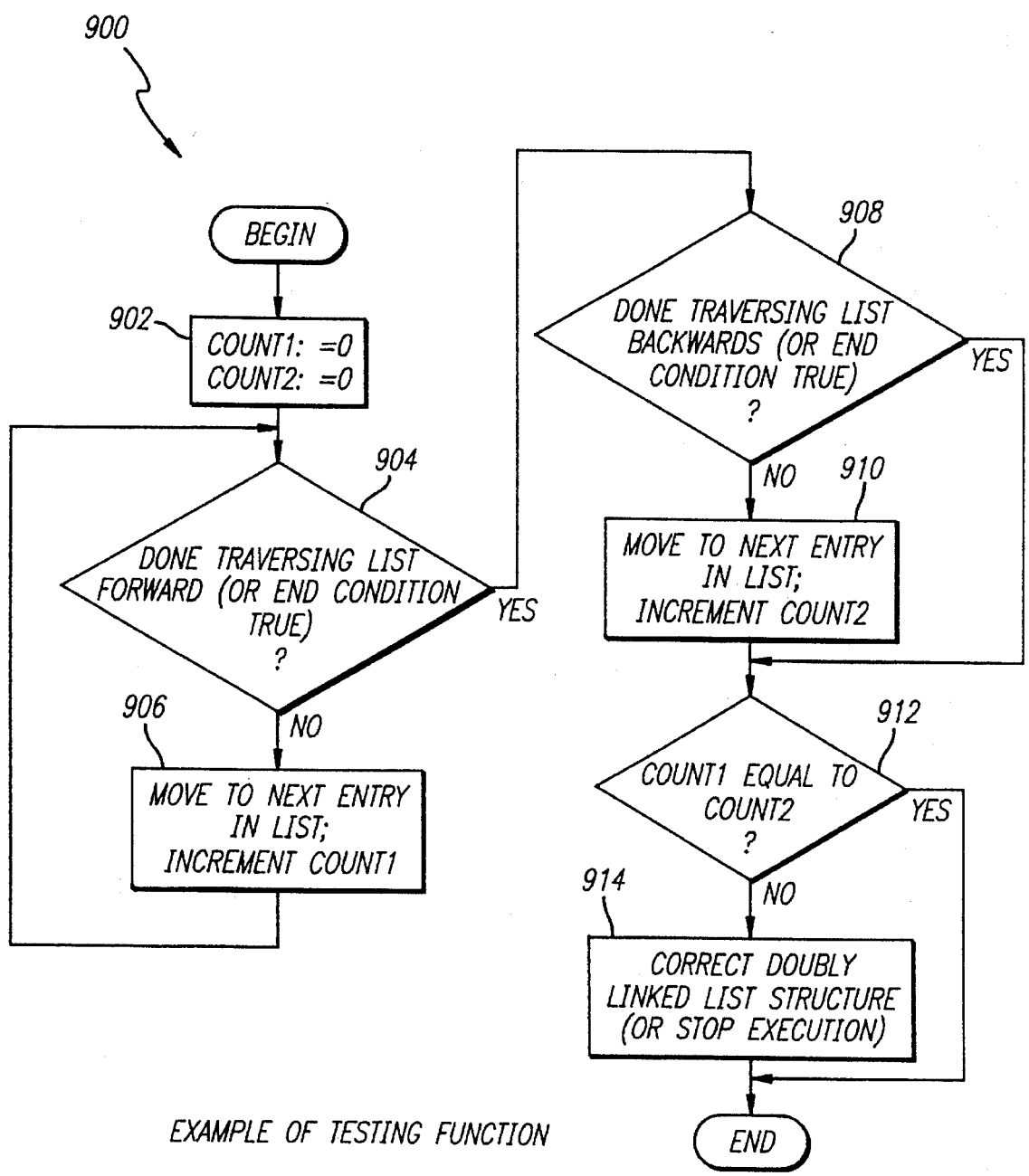
FIG. 9 is a flow chart of steps performed by an example testing function.

FIG. 9 is a flow chart of steps performed by an example testing function. For example, the steps of FIG. 9 could be part of a testing function in anAccount object 310 if the Account class were extended to include a doubly linked list to hold a log of transactions carried out by the Account class. The example of FIG. 9 counts a number of entries in a doubly linked list (not list 550) that is defined for an object. In step 902, a first count value and a second count value are initialized to zero. In steps 904 and 906, control loops through the doubly linked list in a forward direction, counting the entries in the list. When, in step 906, the end of the list is reached (or it is determined that some other end condition, such as a maxcount being reached, is true) control passes to step 908. In steps 908 and 910, control loops through the doubly linked list in a backward direction, counting the entries in the list. When, in step 908, the end of the list is reached (or it is determined that some other end condition, such as a maxcount being reached, is true) control passes to step 912.

In step 912, if the first count (count1) is equal to the second count (count2) then, the structure of the doubly linked list is considered to be without error and control passes to the end. Otherwise, step 914 may attempt to correct the problem discovered within the structure of the doubly linked list. Processes for correction of such errors are not the subject of the present invention and are known to persons of ordinary skill in the art. An example of the correction and detection of errors in data structures is described in Seth and Muralidhar, "Analysis and Design of Robust Data Structures," which is attached hereto as Appendix B, and which is hereby expressly incorporated by reference.

As yet another example, a testing function might also test the integrity of the data contained in an object's data structures. The testing function might, for example, test to see that numeric data is within a valid numeric range.

Figure 10:
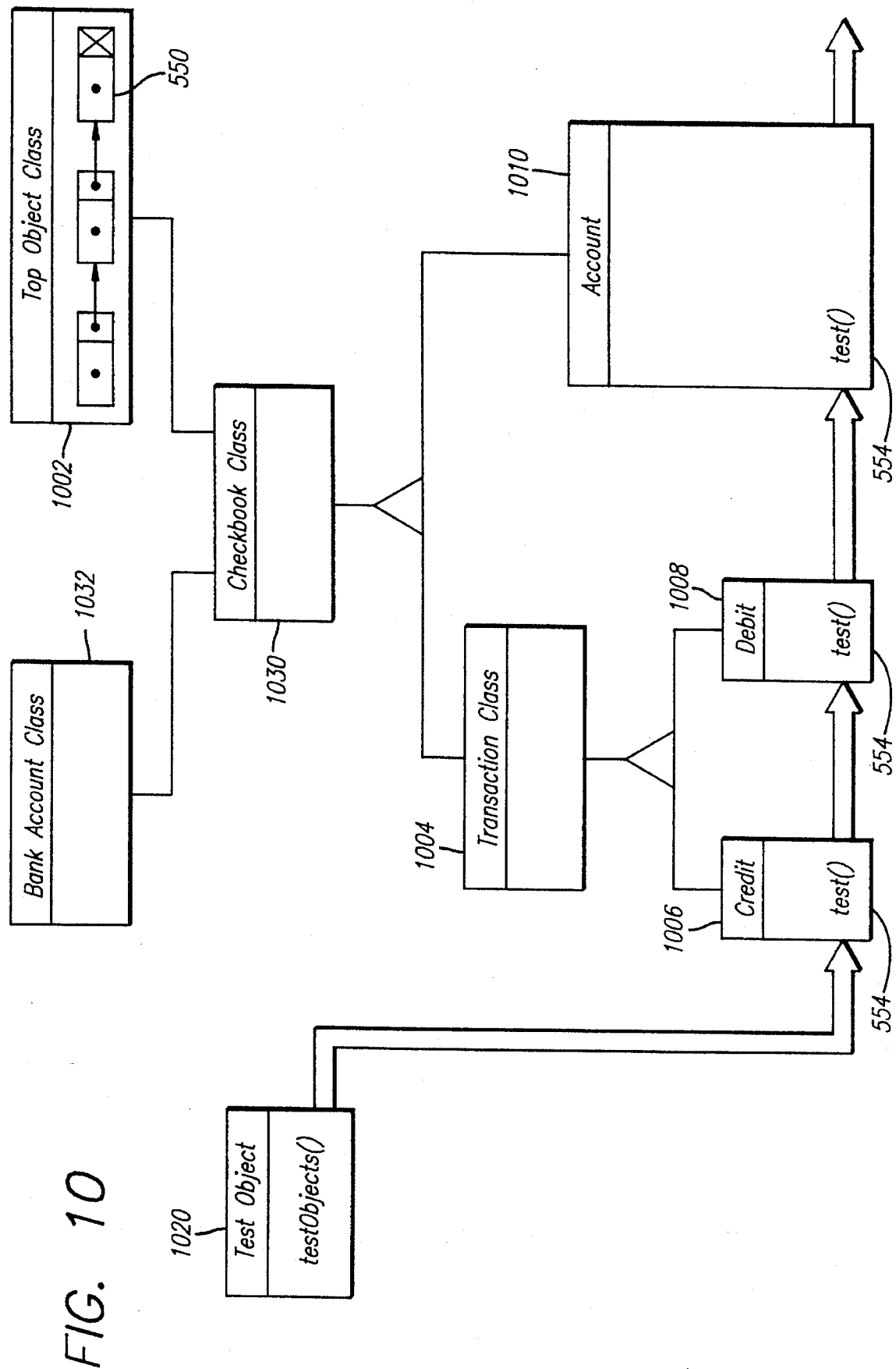
FIG. 10 is a diagram showing a second embodiment of the present invention using multiple inheritance.

FIG. 10 is a diagram showing a second embodiment of the present invention. The second embodiment uses multiple inheritance. The checkbook class 1030 multiply inherits from the Bank Account class 1032 and the TopObject class 1002. Thus, the Checkbook class inherits program functionality from one class and inherits testing functionality from the testing class. A separate class TestObject is not a part of the TopObject class hierarchy. FIG. 10 also shows that an object 1020 of TestObject class accesses testing functions 554 using linked list 550, in the same manner described above. Whether or not one would use multiple inheritance is generally a matter of programming style.

Several preferred embodiments of the present invention have been described. Nevertheless, it will be understood that various modifications may be made without departing from the spirit and scope of the invention.

In describing the preferred embodiments, a number of specific technologies used to implement the embodiments of various aspects of the invention were identified and related to more general terms in which the invention was described. However, it should be understood that such specificity is not intended to limit the scope of the claimed invention.

LIST OF APPENDICES

Appendix A—source code in the C++ programming language implementing the example shown in this document.

Appendix B—Seth and Muralidhar, "Analysis and Design of Robust Data Structures."

Appendix A

$FACE.DIANA.AOTEST4H

```
 1    /******************************************************************
 2     This program prints out the value of each of the data members in
 3     each of the objects.  Note that each printAll() function could be
 4     replaced with any desired test function.
 5    ******************************************************************/
 6
 7    // this file contains class declarations
 8
 9    class TopObject {
10       public:
11          static TopObject* list;   // a static global object that persists
12          TopObject* next;          // each instance of a class contains a
13                                    // pointer to the next one
14
15          TopObject();              // constructor forms a linked list of
16                                    // all instances (objects) created from
17                                    // classes in TopObject class hierarchy
18
19          virtual void deposite()=0;
20          virtual void withdraw()=0;
21          virtual void add(double)=0;
22          virtual void subtract(double)=0;
23          virtual void printBalance()=0;
24          virtual void printAll()=0;
25    };
26
31    class Account:public TopObject{
32       protected:
33          double balance;
34          int object_id;
35
36       public:
37
38          Account(double ibalance,
39                  int iobject_id);
40          void deposite();
41          void withdraw();
42          void add(double);
43          void subtract(double);
44          void printBalance();
45          void printAll();
46    };
48
49    class Transaction:public TopObject {
50       protected:
51          Account* _acctnum;
52          double amount;
53          int object_id;
54       public:
55          Transaction(Account* _iacctnum,
56                      double iamount,
57                      int iobject_id);
58    };
59
60    class Credit:public Transaction{
61       public:
```

A-1

$FACE.DIANA.AOTEST4H

```
62              Credit(Account* _iacctnum,
63                     double iamount,
64                     int iobject_id);
65          virtual void deposite();
66          virtual void withdraw();
67          virtual void add(double);
68          virtual void subtract(double);
69          virtual void printBalance();
70          virtual void printAll();
71      };
72
73      class Debit:public Transaction{
74          public:
75              Debit(Account* _iacctnum,
76                     double iamount,
77                     int iobject_id);
78          virtual void deposite();
79          virtual void withdraw();
80          virtual void add(double);
81          virtual void subtract(double);
82          virtual void printBalance();
83          virtual void printAll();
84      };
85
86
87      // declaration of test object
88
89
90      void TestObjects();
```

A-2

$FACE.DIANA.AOTEST4C

```
 1    // this file contains function definitions
 2
 3    #include <iostream.h>
 4    #include "a0test4.h"
 5
 6    TopObject::TopObject()    // constructor for TopObject forms a linked
 7    { next = list;            // list of all objects created from classes
 8      list = this;            // in TopObject class hierarchy
 9    }
10
11    Account::Account(double ibalance,
12                     int iobject_id)
13
14    {   balance = ibalance;
15        object_id = iobject_id;
16    }
17
18    void Account::deposite()
19    { cout<<"Not applicable to Account Class"<<endl; }
20
21    void Account::withdraw()
22    { cout<<"Not applicable to Account Class"<<endl; }
23
24    void Account::add(double amount)
25    { balance = balance + amount; }
26
27    void Account::subtract(double amount)
28    { balance = balance - amount; }
29
30    void Account::printBalance()
31    { cout<<"Account balance is: "<<balance<<endl; }
32
33    void Account::printAll()
34    { cout<<"You have accessed an instance of the Account Class"<<endl;
35      cout<<"The object_id of this instance is: "<<object_id<<endl;
36      cout<<"Contents of balance: "<<balance<<endl;
37    }
38
39    Transaction::Transaction(Account* _iacctnum,
40                             double iamount,
41                             int iobject_id)
42    {   _acctnum = _iacctnum;
43        amount = iamount;
44        object_id = iobject_id;
45
46    }
47
48    Credit::Credit(Account* _iacctnum,
49                   double iamount,
50                   int iobject_id)
51    :Transaction(_iacctnum, iamount, iobject_id)
52    {}
53
54    void Credit::deposite()
55    { _acctnum->add(amount); }
56
```

$FACE.DIANA.AOTEST4C

```
 57    void Credit::withdraw()
 58    { cout<<"Not applicable to Credit Class"<<endl; }
 59
 60    void Credit::add(double)
 61    { cout<<"Not applicable to Credit Class"<<endl; }
 62
 63    void Credit::subtract(double)
 64    { cout<<"Not applicable to Credit Class"<<endl; }
 65
 66    void Credit::printBalance()
 67    { cout<<"Not applicable to Credit Class"<<endl; }
 68
 69    void Credit::printAll()
 70    {cout<<"You have accessed an instance of the Credit Class"<<endl;
 71      cout<<"The object_id of this instance is: "<<object_id<<endl;
 72      cout<<"Contents of _acctnum: "<<_acctnum<<endl;
 73      cout<<"Contents of amount: "<<amount<<endl;
 74    }
 75
 76    Debit::Debit(Account* _iacctnum,
 77                 double iamount,
 78                 int iobject_id)
 79    :Transaction(_iacctnum, iamount, iobject_id)
 80    {}
 81
 82    void Debit::deposite()
 83    { cout<<"Not applicable to Debit Class"<<endl; }
 84
 85    void Debit::withdraw()
 86    { _acctnum->subtract(amount); }
 87
 88    void Debit::add(double)
 89    { cout<<"Not applicable to Debit Class"<<endl; }
 90
 91    void Debit::subtract(double)
 92    { cout<<"Not applicable to Debit Class"<<endl; }
 93
 94    void Debit::printBalance()
 95    { cout<<"Not applicable to Debit Class"<<endl; }
 96
 97    void Debit::printAll()
 98    {cout<<"You have accessed an instance of the Debit Class"<<endl;
 99      cout<<"The object_id of this instance is: "<<object_id<<endl;
100      cout<<"Contents of _acctnum: "<<_acctnum<<endl;
101      cout<<"Contents of amount: "<<amount<<endl;
102    }
103
104
105    // definition of test object
106
107    void TestObjects()
108    {
109       for(TopObject* p = TopObject::list; p; p = p->next)    //prints value
110          p->printAll();                                       //of data
111    }                                                          //members in
112                                                               //objects
```

A-4

$FACE.DIANA.AOTEST4M

```
1     //this file contains the main function
2
3     #include <iostream.h>
4     #include "a0test4.c"
5
6     // the initialization that makes it all work
7
8     TopObject* TopObject::list = 0;
9
10    // A simple driver for the Account and Transaction classes
11
12    void main()
13    {
14
15        Account*  _account1 = new Account(00.00, 1);
16        _account1=>printBalance();
17
18        Credit aCredit(_account1, 500.00, 2);
19        aCredit.deposite();
20        _account1->printBalance();
21
22        Debit aDebit(_account1, 250.00, 3);
23        aDebit.withdraw();
24        _account1->printBalance();
25
26
27        TestObjects();      //report data in all objects
28    }
```

Program Output

```
Account balance is: 0
Account balance is: 500
Account balance is: 250
You have accessed an instance of the Debit Class
The object_id of this instqnce is: 3
Contents of _acctnum: 0x10000670
Contents of amount: 250
You have accessed an instance of the Credit Class
The object_id of this instance is: 2
Contents of _acctnum: 0x10000670
Contents of amount: 500
You have accessed an instance of the Account Class
The object_id of this instance is: 1
Contents of balance: 250
```

Appendix B

ANALYSIS AND DESIGN OF ROBUST DATA STRUCTURES

SHARAD C. SETH[*] - R. MURALIDHAR[**]

[*] Department of Computer Science, University of Nebraska, Lincoln, NE

[**] WIPRO Information Technology Ltd., Bangalore, India

ABSTRACT

Systematic approaches to the analysis and design of robust data structures are proposed. The analysis is based on an axiomatic definition of a given data structure. Axioms are written such that (1) nonredundant and redundant parts of the structure are captured separately, and (2) each "redundancy feature" is reflected in a separate axiom. The validity of each axiom for a given structure can be checked by a procedure readily derivable from the axiom. For error detection, an instance, possibly corrupted, is checked in turn by all the procedures. The returned boolean values ("syndrome") are looked up in a table to provide a partial or complete resolution of the type of error. Additional information returned by the procedures can be used to correct errors. In the design part of the paper, we suggest the use of "redundancy function" as a means of exploring alternative ways of using available redundant fields of a data structure. The aim is to maximize error-detectability of a robust data structure for a given amount of redundancy.

Introduction

This paper presents systematic approaches to the design and analysis of robust data structures. As in some other recent studies [1, 2, and 3] we restrict consideraton to the problem of preserving structural redundancy of commonly used data structures, assuming that their semantic integrity is protected by some other techniques, such as error detection codes. Thus, we can confine attention to the structural fields of data structures, viz. pointers, node counts, structural identifiers, index limits, etc. We will use the error model proposed in [1]. Briefly, a single error is a change of an arbitrary (structural) field of an arbitrary node in the data structure. The "valid-state hypothesis" [1] will be assumed to hold, that is, (1) pointers outside a particular instance do not point to any node within the instance, and (2) the unique identifier value of an instance, whenever used, appears only in its own identifier fields. Multiple errors are unintentional changes in multiple fields arbitrarily distributed over the instance. A "macro-fault" [4], in which all the fields of a node are affected, would be treated as a multiple fault according to this model. As measures of robustness, we will only consider the following two [4]: detectability which is the maximum number of errors that can be detected, and correctability which is the maximum number of detectable errors that can be corrected to yield a unique valid instance of the data structure. Other measures also exist and a summary of these can be found in [4].

An Axiomatic Model For Robust Data Structures

The use of axioms in a rigorous definition of data structure is not new; there exists a large and growing body of literature on abstract data types (see, for example, [5]) which use axiomatic definitions to present a functional view of the data structure while hiding all details related to specific implementations. Here, we want to do just the opposite. The operations on the structure, which involve semantic processing, are not of concern to us; on the other hand, the fact that a binary tree is stored in an array rather than a linked list, is crucial to its structural integrity.

The following notation will be used in writing the axioms (also called assertions in the sequel) for a given robust data structure:

S: An instance of the data structure under consideration.

N, N1, N2, etc.: Nodes in S.

H: the header node in S.

H1, H2, etc.: Multiple header nodes, whenever used.

nil: the null pointer.

$f1(N)$, $f2(N)$, etc.: the fields associated with the node N in S.

$f1^k(N)$: the node reached by "chasing" the f1 field k times from N, where k is positive.

Note that, in the last definition, a zero value of k would indicate staying at N.

An axiomatic model for a robust structure would consist of a series of assertions which must be true for any instance of the given structure and false for any non-instance. Generally speaking, it would be possible to write the assertions in such a way that (1) non-redundant and redundant parts of the structure are captured by separate sets of assertions, and (2) each "redundancy feature", defined by a redundant field, has its own separate set of characterizing assertions.

The following definition of a robust doubly linked list, will illustrate our basic approach. This structure has the "front" and "back" pointer fields, denoted as "f1" and "f2" respectively. Either of these two could be considered to be redundant, since, just one link is sufficient to define the list structure. The structure has further redundancies in the form of an identifier field ("id") in each node, and a count field ("count") in the header node.

Example 1 Doubly Linked List (DLL):

1(a) if (N1 is in S and f1(N1) = N2) then (N2 is in S).

1(b) for all N1 and N2 in S, $f1^k(N1) = N2$ for some integer k.

{These assertions define the non-redundant, single-circularly-linked list structure.}

2(a) if (f1(N1) = N2) then (f2(N2) = N1) for all $N_1$, $N_2$ in S.

2(b) if (f2(N1) = N2) then (f1(N2) = N1) for all $N_1$, $N_2$ in S.

{These assertions show the relationship of the redundant field f2 with f1}.

3(a) if (f1(N1) = N2) then (id(N1) = id(N2)).

3(b) if (f2(N1) = N2) then (id(N1) = id(N2)).

{These assertions show the constraint imposed by the "id" field.}

4(a) if (m = count(H)) then $(f1^k(H) = H$ if k = m+1).

4(b) if (m = count(H)) then $(f2^k(H) = H$ if k = m+1).

{These assertions capture the constraint imposed by the "count" field.}

Error Detection and Correction

A semi-automatic method will be given for error detection and correction. In this method, each assertion is converted to a procedure which verifies whether or not a given structure satisfies the assertion. Note, however, that no errors can be detected in a non-redundant data structure so attention can be confined to the "redundant" assertions for the purpose of error detection and recovery.

Such procedures are readily derived and appear in Appendix I for our example of DLL. Each procedure returns a "true" value whenever it finds a violation of the assertion being checked, otherwise, it returns a "false" value. It will be seen that in some cases the procedures return more information than just a "true" or a "false" value. This information is in the form of a suspected node and is necessary only if error detection is to be followed by diagnosis and correction. Also, since these procedures must be able to work with corrupted structures, special consideration must be given to ensure termination in all cases of anticipated errors.

Error Detection

Once procedures for verifying redundant assertions are available, a syndrome table can be constructed as an aid to isolate the type of error. There is a row in this table for each distinct type of error and a column for each procedure. The table entries record the "true" (T) and "false" (F) responses of the procedures for different types of errors. The vector of T and F values in a row will be called the syndrome of the type of error represented by the row. The identification of various types of errors that can occur is a prerequisite to the construction of the syndrome table. In case of a multiple error, all combinations of single error types must be considered as possible. A syndrome table for the DLL is shown below:

| | Error Flags | | | | | |
|---|---|---|---|---|---|---|
| | 2a | 2b | 3a | 3b | 4a | 4b |
| No error | F | F | F | F | F | F |
| id-field change | F | F | T | T | F | F |
| count change | F | F | F | F | T | T |
| f1 change to foreign node | T | T | T | F | T | F |
| f1 change to local node | T | T | F | F | T | F |
| f2 change to foreign node | T | T | F | T | F | T |
| f2 change to local node | T | T | F | F | F | T |

We present the following analysis of the above syndrome table as an example of the kind of information that can be derived from it:

(a) Assume all the procedures are applied in a test. Since the correct instance results in a syndrome that is unique, detectability is guaranteed for single errors. Also, since, no two rows are identical, the syndrome can be used to identify the error type uniquely.

(b) The loss in resolution of the error type, due to suppression of certain columns in the table, can also be analyzed. For example, without the error flags 4a and 4b the resolution is still almost perfect; only the error types "f1 change to local node" and "f2 change to local node" can not be resolved. (Note: If the suspect-node information returned by the procedures is used, even this error can be resolved.)

(c) Though the procedures are independent of each other, a particular sequence of application may be more efficient for error resolution than others. For example, in DLL, the error "id-field change" is resolved by just the flags 3a and 3b. Hence, a good sequence might start with the corresponding procedures.

Error Correction

Taylor and Black [3] identify error correction as a much more difficult problem than error detection. Amongst the five general principles enunciated by them, the use of a fault table is the one naturally suggested by our axiomatic model.

While we are not able to state general principles for error correction, in situations where error detection immediately follows examination of an erroneous field, the following basic principle can be used. Within the procedures verifying the assertions, there will be a particular condition which will be checked to determine the "true" or the "false" response. Typically, this condition is in the form of an equality whose violation represents an error. The correction is achieved by changing the appropriate field of the culprit node to reestablish the equality. Identification of the corrupted field follows immediately from the error type so the problem boils down to the correct identification of the culprit node. This invariable requires examining the additional information returned by the procedures.

As an example, if flags 3a and 3b in DLL were returned as true, we find from the syndrome table that an "id-field change" error is indicated. Further, the procedure 3a and 3b would have narrowed down the choice of the culprit node to one amongst the suspect nodes returned by the two procedures. Further analysis indicates that only two cases need to be considered to identify the culprit node uniquely: (1) the culprit node is the header and (2) the culprit node is other than the header. In the first case the suspect1's returned by the two procedures 3a and 3b would be both pointing to the header. In the second case the suspect2's point to the offending node.

A correction procedure for DLL based on the above principles is presented in Appendix II. It is not dissimilar to that given in [2]. A notable difference, however, is that our procedure is derived in a systematic manner from the syndrome table and the detection procedures for DLL.

Enhancement of Detectability

In this section we will be concerned with a restricted form of the design problem which can be stated as follows. We are given a robust data structure which contains a certain number of redundant fields. Our aim is to explore alternative ways of using existing redundant fields so as to increase the error detectability of the structure.

Consider the set of assertions which define the given robust data structure. All the alternatives that we consider will preserve the _form_ of these assertions. However, the specific use of each redundant field will be replaced by a _redundancy function_, that is, a place holder for different actual uses of that field. As an example consider the assertion 2(b) for DLL:

if f2(N1) = N2 then f1(N2) = N1.

Here, we will redefine the specific "predecessor" field f2 by using a redundancy frunction F in the "then-clause" instead of "f1".

if f2(N1) = N2 then F(N2) = N1.

Different choices of F lead to different uses of the redundant field and to different robust data structures, all derived from the basic doubly-linked list structure. For example, replacing F by "the successor of the successor" function would lead to the mod(2) DLL structure discussed in [2].

In the case of threaded binary trees [6], the function is replaced by the "in-order successor" (for the right-link fields) and by the "in-order predecessor" (for the left-link fields). For a chained tree [3] the redundancy function would be "the next node in the in-order sequence whose left link (f1) is nil". In the sequel we show the usefulness of this idea by means of an example.

Mod(2) CTB-tree

The mod(2) CTB-tree is an extension of the CTB-tree [2]. The extension resembles the mod(2) DLL extension of the standard DLL, hence the choice of its name. It is a binary tree in which all the right-link fields with a NIL value are replaced by "threads" and all the left-link fields with a NIL value are replaced by "chains". These threads and chains derive their names from the CTB-tree but are defined in a different manner. A thread in a mod(2) CTB-tree will point to the node which was pointed to by the succeeding thread (in in-order sequence) in a CTB-tree implementation of the same data. Similarly, a chain from a node in a mod(2) CTB-tree will point to the node which was pointed to be the succeeding chain in the corresponding CTB-tree. An example of a CTB-tree and the corresponding mod(2) CTB-tree appears in Fig. 1.

It can be proved that the detectability of a mod(2) CTB-tree is at least 3. This is shown by concentrating on "ch-diff" [7], the minimum number of changes required to convert a valid instance of the data structure to another valid instance with a different number of nodes. As shown in [7], the detectability is one less than the minimum of ch-same, ch-repl, and ch-diff. The proof appears in [8] but is being omitted here because of its length.

Conclusion

In this paper we have suggested systematic approaches to the analysis and design of robust data structure. The detection and the correction procedures presented are not necessarily the most efficient. Nevertheless, they were derived in a systematic manner from a rigorous description of the data structure. This method will be useful particularly when the structure is complex. The redundancy functional was presented as a means of dealing with the problems of efficient use of available redundant fields. The idea, which was used to develop the mod(2) CTB-tree structure, can be extended to other structures as well. Finding a proper design criterion to be satisfied by the redundancy functional is one direction in which the work reported herein can be extended.

References

[1] D. J. Taylor, J. P. Black, and D. E. Morgan, "Redundancy in data structures: some theoretical results," IEEE Trans. Software Eng., vol. SE-6, No. 6, Nov. 1980, pp. 595-602.

[2] D. J. Taylor, J. P. Black, and D. E. Morgan, "Redundancy in data structures: improving software fault tolerance," IEEE Trans. Software Eng., vol. SE-6, No. 6, Nov. 1980, pp. 585-594.

[3] D. J. Taylor and J. P. Black, "Principles of data structure error correction," IEEE Trans. Computers, vol. C-31, No. 7, July 1982, pp. 602-608.

[4] J. P. Black, D. J. Taylor, and D. E. Morgan, "A compendium of robust data structures," Dig. FTCS-11, Portland, Maine, June 24-26, 1981, pp. 129-131.

[5] R. T. Yeh (ed.), Current Trends in Programming Methodology, Vol. IV, Data Structuring, Prentice Hall, Englewood Cliffs, NJ, 1978.

[6] D. E. Knuth, Fundamental Algorithms, The Art of Computer Programming: Vol. 1, Addison-Wesley, Reading, Mass. 1979, pp. 319-322.

[7] J. P. Black, D. J. Taylor, and D. E. Morgan, "An introduction to robust data structures," Dig. FTCS-10, Kyoto, Japan, Oct. 1-3, 1980, pp. 110-112.

[8] R. Muralidhar, "Structural redundancy for detection and correction of errors in data structures," M. Tech. Thesis, Computer Science Programme, Indian Institute of Technology, Kanpur, April 1983.

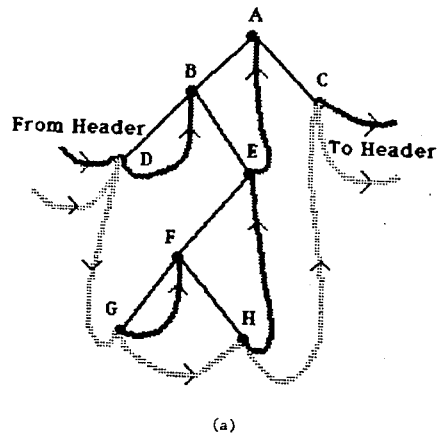

(a)

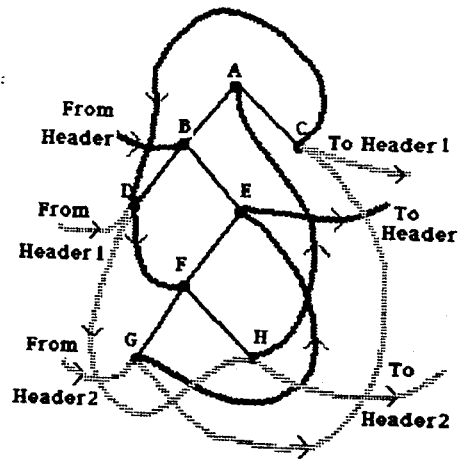

(b)

LEGEND

— LINK

⁓ THREAD

⁓⁓ CHAIN

Fig. 1 (a) A CTB-tree (b) A Mod(2) CTB-tree

Appendix I: Detection Procedures for DLL

Assertion 2

These assertions check whether the forward and the back pointers of adjacent nodes are properly formed. Procedure names are keyed to the axiom names used in the paper. In Procedure 2a traversal is done using the forward pointers, while checking that the back pointer from the current node points to the previous node. Similar checking is done in Procedure 2b which traverses the list using the back pointers. Either procedure terminates when an error is detected or if the header is reached.

```
procedure2a (H:node);

global var error2a: boolean;
      suspect12a, suspect22a: node;
   var N1, N2: node;
   begin
      N1:=H; error2a:=false;
      suspect12a:=nil; suspect 22a:=nil;
      repeat
         N2:=f1(N1);
         if (f2(N2)=N1) then N1 := N2
         else error2a:=true;
      until (N2=H) or (error2a);
      if error2a then
      begin
         suspect12a:=N1;
         suspect22a:=N2;
      end
   end;

procedure 2b(H:node);

global var error2b: boolean;
      suspect12b, suspect22b: node;
   var N1, N2: node;
   begin
      N1:=H; error2b:=false;
      suspect12b:=nil; suspect22b:=nil
      repeat
         N2:=f2(N1);
         if (f1(N2)=N1) then N1 := N2
         else error2b:=true
      until (N2=H) or (error2b);
      if error2b then
      begin
         suspect12b:=N1;
         suspect22b:=N2;
      end
   end;
```

Assertion 3

The following procedures check the validity of assertions 3a and 3b. A count of the number of nodes traversed is kept in both the cases to ensure termination of the procedure.

```
procedure 3a(H:node);

global var error3a: boolean;
      suspect13a, suspect23a: node;
   var N1, N2: node; m, nodecount: integer;
   begin
      N1:=H; error3a:=false
      suspect13a:=nil; suspect23a:=nil;
      nodecount:=0; m:=count(H);
      repeat
         N2:=f1(N1); nodecount:=nodecount+1
         if (id(N1)=id(N2)) then N1:=N2
         else error3a:=true;
      until (N2=H)or(error3a)or(nodecount > m+1)
      if error3a then
      begin
         suspect13a:=N1; suspect23a:=N2
      end;
   end;

procedure 3b(H:node);

global var error3b: boolean
      suspect13b, suspect23b: node;
   var N1, N2: node; m, nodecount: integer;
   begin
      N1:=H; error3b:=false;
      suspect13b:=nil; suspect23b:=nil;
      nodecount:=0; m:=count(H);
      repeat
         N2:=f2(N1); nodecount:=nodecount+1;
         if (id(N2)=id(N1)) then N1:=N2
         else error3b:=true;
      until (N2=H)or(error3b)or(nodecount > m+1)
      if error3b then
      begin
         suspect13b:=N1; suspect23b:=N2
      end;
   end;
```

Assertion 4

The following procedures check for the validity of assertions 4a and 4b. Traversal using one of the two pointer fields is done over the entire structure and a count of the nodes encountered is compared against the stored count for any mismatch.

```
procedure 4a(H:node)
   global var error4a:boolean;
      nodecount: integer;
   var N1, N2: node; m: integer;
   begin
      N1:=H; error4a:=false;
      nodecount:=0; m:=count(H);
      repeat
         N2:=f1(N1); nodecount:=nodecount+1;
         if (N2=H) then error4a:=(nodecount ≠ m+1)
      until (nodecount > m+1) or (error4a);
      if (nodecount > m+1) then (error4a:=N2 ≠ H)
   end
```

```
procedure 4b(H:node)

global var error4b: boolean;
        nodecount: integer
    var N1, N2: node; m: integer
    begin
        N1:=H; error4b:=false;
        nodecount:=0; m:=count(H);
        repeat
            N2:=f2(N1); nodecount:=nodecount+1;
            if (N2=H) then error4b:(nodecount ≠ m+1)
        until (nodecount ≥ m+1) or (error4b);
        if (nodecount ≥ m+1) then (error4b:N2 ≠ H)
    end
```

Appendix II: A Correction Procedure for DLL

```
procedure correct (H:node);

global var error2a, error2b,
        error3a, error3b, error4a, error4b: boolean;
        suspect12a, suspect22a,
        suspect12b, suspect22b:node;
        suspect13a, suspect23a,
        suspect13b, suspect23b:node;
        nodecount: integer;
    var good: node;
    begin
        if (error3a) and (error3b) then
        begin
            if (suspect13a = suspect13b) then
            begin
                culprit:=suspect13a; good:=suspect23a)
            end;
            else
            begin
                culprit:=suspect23a; good:=suspect13a)
            end;
            id(culprit):=id(good); return
        end;
        if (error2a) then
            if suspect12a = suspect22b then
            begin
                culprit:=suspect12a
                f1(culprit):=suspect12b;
                return;
            end;
        if (error2b) then
        begin
            culprit:=suspect12b;
            f2(culprit):=suspect12a;
            return;
        end;
        if (error4a) or (error4b) then
        begin
            count(H):=nodecount;
        end;
    end;
```

We claim:

1. A method of testing individual objects in an object-oriented programming environment, comprising the steps, performed by a data processing system, of:

establishing a container object that will be updated to contain a pointer to each newly instantiated object;

establishing a function for the TopObject class that places in the container object a pointer to each newly created object when each new object is created;

creating a new object that belongs to the TopObject class, thereby causing the function to add a pointer in the container object for the new object, wherein the new object contains a respective testing function; and performing a global testing function that will traverse the object pointers in the container object and will invoke the respective testing function within each object pointed to, in accordance with the object pointers in the container object.

2. The method of claim 1, wherein each object in the object-oriented programming environment contains a testing function for that object.

3. The method of claim 1, wherein the performing step further includes the step of performing a plurality of respective testing functions, wherein each respective testing function is within respective new objects pointed to by the entries in the container object.

4. The method of claim 1, wherein the performing step further includes the step of performing a single testing function within an object that is associated with a predetermined one of the entries in the container object, the predetermined one of the entries being indicated in accordance with an iterator function.

5. The method of claim 1, wherein the step of performing a testing function includes the step of testing the integrity of a data structure local to the object containing a respective testing function.

6. The method of claim 1, wherein the step of performing a testing function includes the step of testing the integrity of data local to the object containing a respective testing function.

7. The method of claim 1, wherein at least one of the objects tested has a data structure internal to that object.

8. The method of claim 1, wherein the container object is a static data structure that can be accessed by all objects in the object-oriented programming environment.

9. The method of claim 1, wherein the performing step is performed by a test object.

10. The method of claim 1, wherein the container object is a linked list in a TopObject of the TopObject class.

11. A computer program product, including computer usable medium having computer readable code embodied therein for testing individual objects in an object-oriented programming environment, the computer program product comprising:

computer readable program code devices configured to cause a computer to effect establishing a container object that will be updated to contain a pointer to each newly instantiated object;

computer readable program code devices configured to cause a computer to effect establishing a function for the TopObject class that places in the container object a pointer to each newly created object when each new object is created;

computer readable program code devices configured to cause a computer to effect creating a new object that belongs to the TopObject class, thereby causing the function to add a pointer in the container object for the new object, wherein the new object contains a respective testing function; and computer readable program code devices configured to cause a computer to effect performing a global testing function that will traverse the object pointers in the container object and will invoke the respective testing function within each object pointed to, in accordance with the object pointers in the container object.

12. The computer program product of claim 11, wherein each object in the object-oriented programming environment contains a testing function for that object.

13. The computer program product of claim 11, wherein the computer readable program code devices configured to cause a computer to effect performing further includes computer readable program code devices configured to cause a computer to effect performing a plurality of respective testing functions, wherein each respective testing function is within respective new objects pointed to by the entries in the container object.

14. The computer program product of claim 11, wherein the computer readable program code devices configured to cause a computer to effect performing a testing function includes computer readable program code devices configured to cause a computer to effect testing the integrity of a data structure local to the object containing a respective testing function.

15. The computer program product of claim 11, wherein the computer readable program code devices configured to cause a computer to effect performing a testing function includes computer readable program code devices configured to cause a computer to effect testing the integrity of data local to the object containing a respective testing function.

16. The computer program product of claim 11, wherein at least one of the objects tested has a data structure internal to that object.

17. The computer program product of claim 11, wherein the container object is a static data structure that can be accessed by all objects in the object-oriented programming environment.

18. The computer program product of claim 11, wherein the container object is a linked list in a TopObject of the TopObject class.

* * * * *